(12) United States Patent
Jang et al.

(10) Patent No.: US 8,077,374 B2
(45) Date of Patent: Dec. 13, 2011

(54) DISPLAY DEVICES USING ELECTROCHROMISM AND POLYMER DISPERSED LIQUID CRYSTAL AND METHODS OF DRIVING THE SAME

(75) Inventors: Jae-eun Jang, Seoul (KR); Seung-nam Cha, Seoul (KR); Jae-eun Jung, Seoul (KR); Yong-wan Jin, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/458,534

(22) Filed: Jul. 15, 2009

(65) Prior Publication Data

US 2010/0182673 A1    Jul. 22, 2010

(30) Foreign Application Priority Data

Jan. 19, 2009   (KR) .................. 10-2009-0004200

(51) Int. Cl.
*G02F 1/155* (2006.01)
(52) U.S. Cl. .............. 359/270; 359/267; 359/273
(58) Field of Classification Search .......... 359/265–275; 345/107, 105, 84, 48
See application file for complete search history.

(56) References Cited

U.S. PATENT DOCUMENTS

| | | | | |
|---|---|---|---|---|
| 5,416,617 A * | 5/1995 | Loiseaux et al. | ................... | 349/1 |
| 5,828,431 A * | 10/1998 | Ando et al. | ...................... | 349/86 |
| 6,278,505 B1 | 8/2001 | Okada et al. | | |
| 6,600,527 B1 | 7/2003 | Basturk et al. | | |
| 6,788,452 B2 * | 9/2004 | Liang et al. | ................... | 359/296 |
| 7,352,500 B2 * | 4/2008 | Jagt et al. | ...................... | 359/265 |
| 7,440,052 B2 * | 10/2008 | May | .............. | 349/113 |
| 7,724,431 B2 * | 5/2010 | Field et al. | ..................... | 359/443 |
| 2003/0184692 A1 | 10/2003 | Nagae | | |

FOREIGN PATENT DOCUMENTS

| | | |
|---|---|---|
| EP | 0 887 694 | 12/1998 |
| EP | 1 933 193 | 6/2008 |
| EP | 2 161 613 | 3/2010 |
| JP | 2005-107228 | 4/2005 |
| KR | 10-2006-0078639 | 7/2006 |
| KR | 10-2008-0042568 | 5/2008 |
| WO | WO 2005/072447 | 8/2005 |

OTHER PUBLICATIONS

European Search Report dated May 20, 2010 for corresponding Application No. 09179116.0-2205.
European Search Report dated Sep. 9, 2010 for corresponding Application No. 09179116.0-2205.
European Search Report dated Aug. 1, 2011, in corresponding European Patent Application No. 11162116.5.

* cited by examiner

*Primary Examiner* — Ricky Mack
*Assistant Examiner* — Tuyen Tra
(74) *Attorney, Agent, or Firm* — Harness, Dickey & Pierce, PLC

(57) ABSTRACT

Provided are display devices using electrochromism and PDLC and methods of driving the display devices. A display device may include a plurality of first electrodes and a plurality of second electrodes; a polymer dispersed liquid crystal (PDLC) layer between the first electrodes and the second electrodes; a plurality of third electrodes and a plurality of fourth electrodes; a plurality of electrochromic layers between the third electrodes and the fourth electrodes; and an electrolyte layer between the third electrodes and the fourth electrodes.

26 Claims, 11 Drawing Sheets

DISPLAY DEVICES USING ELECTROCHROMISM AND POLYMER DISPERSED LIQUID CRYSTAL AND METHODS OF DRIVING THE SAME

CROSS-REFERENCE TO RELATED APPLICATIONS

This application claims priority under 35 U.S.C. §119 to Korean Patent Application No. 10-2009-0004200, filed on Jan. 19, 2009, in the Korean Intellectual Property Office (KIPO), the entire contents of which is incorporated herein by reference.

BACKGROUND

1. Field

One or more embodiments relate to display devices using electrochromism and polymer dispersed liquid crystal (PDLC) and methods of driving the display devices.

2. Description of the Related Art

An electrochromic device includes an electrochromic material that changes color in response to received charges (e.g., electrons and/or holes). An electrochromic device may be used in a display device, for example, an electronic paper device (e-paper) or an advertising board device (e.g., billboard). The electrochromic device may exhibit memory characteristics in that even if power to the device is discontinued, if the color of the electrochromic device has already been changed, the color-changed state may be maintained and the electrochromic device may realize a still image. However, response speed of electrochromic devices may be decreased as compared to other memory technologies and an electrochromic device may not realize acceptable moving images.

A display device, such as a liquid crystal display (LCD), may realize acceptable moving images. However, since LCDs do not have memory properties, if the power supply is discontinued, a displayed screen image may not be maintained and the LCD may not realize a still image. Accordingly, when the LCD is used in, for example, an electronic paper device or advertising board device, a continuous power supply may be required.

SUMMARY

One or more embodiments include display devices using electrochromism and polymer dispersed liquid crystal (PDLC) and a methods of driving the display devices.

One or more example embodiments include a display device including a plurality of first electrodes and a plurality of second electrodes; a polymer dispersed liquid crystal (PDLC) layer between the first electrodes and the second electrodes; a plurality of third electrodes and a plurality of fourth electrodes on and spaced apart from the second electrodes, a plurality of electrochromic layers between the third electrodes and the fourth electrodes; and an electrolyte layer between the third electrodes and the fourth electrodes.

A light absorbing layer may be on the first electrodes. The PDLC layer, the first electrodes, the second electrodes, the third electrodes, the fourth electrodes, the electrochromic layers, and the electrolyte layer may be included in a pixel of a display device. The electrochromic layers may include at least three different electrochromic layers. The electrochromic layers may include red and cyan electrochromic layers which face each other in a vertical direction, green and magenta electrochromic layers which face each other in a vertical direction, and blue and yellow electrochromic layers which face each other in a vertical direction. The first electrodes may include a common electrode that is a single body, the second electrodes may include first pixel electrodes, the third electrodes may include second pixel electrodes corresponding to the first pixel electrodes, and the fourth electrodes may include a common electrode that is a single body. The first pixel electrodes and the second pixel electrodes that correspond to each other may be electrically connected by at least one thin film transistor (TFT).

The display device may be driven to realize a still image by applying a voltage between at least one corresponding pair of electrodes, the corresponding pair of electrodes including one of the third electrodes and one of the fourth electrodes; and not applying a voltage between the first and second electrodes. The display device may be driven to realize a moving image by applying a first voltage between the third electrodes and the fourth electrodes; removing the first voltage and leaving the third and fourth electrodes in a floating state; and applying a second voltage between at least one corresponding pair of electrodes, the corresponding pair of electrodes including one of the first electrodes and one of the second electrodes.

One or more example embodiments include a plurality of first electrodes and a plurality of second electrodes; a PDLC layer between the first electrodes and the second electrodes, and including black dyes; a plurality of third electrodes and a plurality of fourth electrodes, the third electrodes and the fourth electrodes on and spaced apart from the second electrodes; a plurality of electrochromic layers between the third electrodes and the fourth electrodes; and an electrolyte layer between the third electrodes and the fourth electrodes.

Display devices using electrochromism and PDLC according to example embodiments may realize a moving image and a still image due to memory characteristics of electrochromic layers.

BRIEF DESCRIPTION OF THE DRAWINGS

Example embodiments will be more clearly understood from the following brief description taken in conjunction with the accompanying drawings. FIGS. 1-19 represent non-limiting, example embodiments as described herein.

FIG. 1 is a cross-sectional schematic of a display device according to an example embodiment;

FIG. 2 is a cross-sectional schematic illustrating a method of realizing a still image using the display device of FIG. 1;

FIG. 3 is a cross-sectional schematic illustrating a method of realizing a moving image using the display device of FIG. 1;

FIGS. 4-5 are cross-sectional schematics of a display device according to example embodiments;

FIG. 6 is a cross-sectional schematic illustrating a method of realizing a still image using the display device of FIG. 5;

FIG. 7 is a cross-sectional schematic illustrating a method of realizing a moving image using the display device of FIG. 5;

FIG. 8 is a cross-sectional schematic of a display device according to an example embodiment;

FIG. 9 is a cross-sectional schematic illustrating a method of realizing a still image using the display device of FIG. 8;

FIG. 10 is a cross-sectional schematic illustrating a method of realizing a moving image using the display device of FIG. 8;

FIG. 11 is a cross-sectional schematic of a display device according to an example embodiment;

FIG. 12 is a cross-sectional schematic illustrating a method of realizing a still image using the display device of FIG. 11;

FIG. 13 is a cross-sectional schematic illustrating a method of realizing a moving image using the display device of FIG. 11;

FIG. 14 is a cross-sectional schematic of a display device according to an example embodiment;

FIG. 15 is a schematic illustrating a process for realizing red color using the display device of FIG. 14;

FIG. 17 is a cross-sectional schematic of a display device according to an example embodiment;

FIG. 18 is a cross-sectional schematic illustrating a method of realizing a still image using the display device of FIG. 17; and FIG. 19 is a cross-sectional schematic illustrating a method of realizing a moving image using the display device of FIG. 17.

Figure 1:
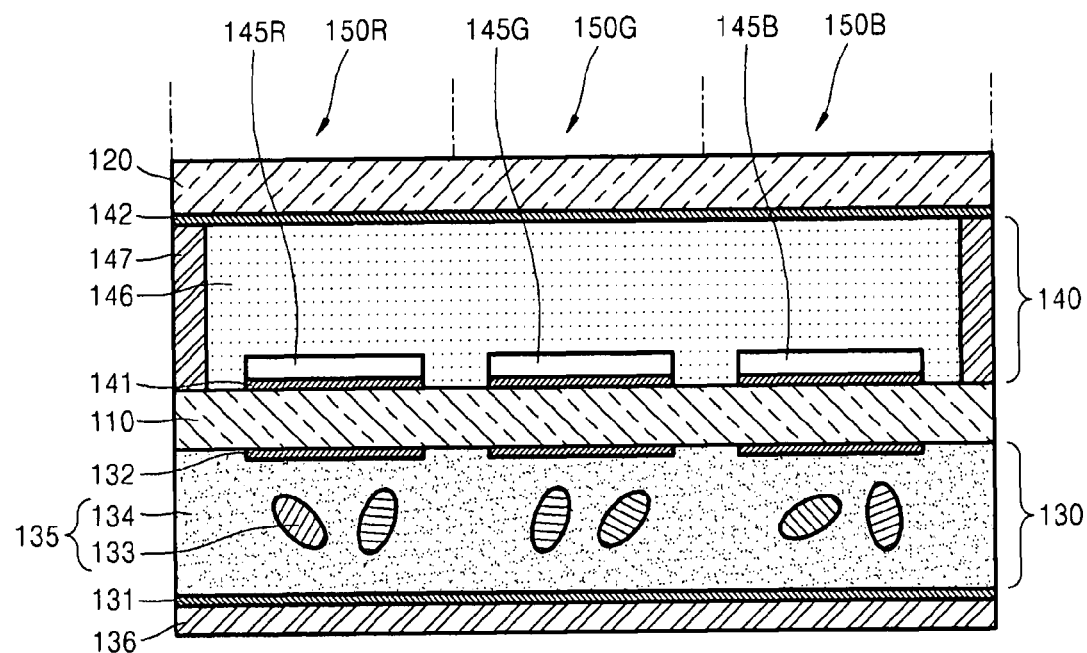

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. Example embodiments may be described with reference to colors for convenience. The transmissibility of the electrochromic materials in a color-changed state may be described to show device characteristics.

FIG. 1 is a cross-sectional schematic of a display device according to an example embodiment. FIG. 1 illustrates one pixel of a display device, wherein the pixel includes red, green, and blue sub-pixels 150R, 150G, and 150B.

Referring to FIG. 1, the display device according to an example embodiment may include a polymer dispersed liquid crystal (PDLC) region 130 and an electrochromic region 140 on the PDLC region 130. The PDLC region 130 may include a plurality of first electrodes 131 and a plurality of second electrodes 132, the first electrodes 131 and the second electrodes 132 spaced apart from one another. The PDLC region 130 may also include a PDLC layer 135 between the first electrodes 131 and the second electrodes 132. In a passive matrix (PM) type display device, the first electrodes 131 and the second electrodes 132 may cross each other. In an active matrix (AM) type display device, the first electrodes 131 may be one body and may be a common electrode and the second electrodes 132 may correspond to sub-pixels 150R, 150G and/or 150B each having a color. Alternatively, the second electrodes 132 may be one body and may be a common electrode. The first and second electrodes 131 and 132 may be and/or include a transparent conductive material. The PDLC layer 135 may include a polymer 134 and liquid crystals 133 dispersed in the polymer 134. A light absorbing layer 136 may be on the first electrode 131.

A first transparent substrate 110 may be between the PDLC region 130 and the electrochromic region 140. The electrochromic region 140 may include a plurality of third electrodes 141 and a plurality of fourth electrodes 142. The third electrodes 141 and the fourth electrodes 142 may be spaced apart from one another. The electrochromic region 140 may also include a plurality of electrochromic layers 145R, 145G, and 145B on the third electrodes 141, and an electrolyte layer 146 may be between the third electrodes 141 and the fourth electrodes 142. In a PM type display device, the third electrodes 141 and the fourth electrodes 142 may cross each other. In an AM type display device, the fourth electrodes 142 may be one body and may be a common electrode, and the third electrodes 141 may correspond to sub-pixels 150R, 150G, and 150B each having a color. Alternatively, the third electrodes 141 may be one body and may be a common electrode. Each of the third and fourth electrodes 141 and 142 may be and/or include a transparent conductive material.

The display device may include a red electrochromic layer 145R, a green electrochromic layer 145G, and/or a blue electrochromic layer 145B which respectively turn red, green, and blue in response to an applied electric field. The electrochromic layers 145R, 145G, and 145B may include nano particles and electrochromic materials coated on a surface of the nano particles. The nano particles may be a metal oxide, for example a transition metal oxide (e.g., $TiO_2$). The electrochromic materials may change color upon receiving charges (e.g. electrons and/or holes) during application of an electric field. The electrochromic layers 145R, 145G, and 145B may be an electrochromic material coating on the third electrodes 141. An electrolyte layer 70 may be between (e.g., filled between) the third electrodes 141 and the fourth electrodes 142 so that ions move when electrochromism occurs. The electrolyte layer 70 may be a solvent and an ionized material. The ionized material may be, for example, melted into the solvent. Although not shown in FIG. 1, a material layer including a material corresponding to the electrochromic material may be between the third electrodes 141 and the fourth electrodes 142 in order to increase charge stability. For example, when the electrochromic layers 145R, 145G, and 145B are an electrochromic material that receives electrons to cause electrochromism, the corresponding material layer may be a material that receives holes when electrochromism occurs. The corresponding material layer may be on the electrochromic material layers 145R, 145G, and 145B. A transparent second substrate 120 may be on the fourth electrodes 142. In FIG. 1, reference numeral 147 may denote a dividing wall.

Figure 2:
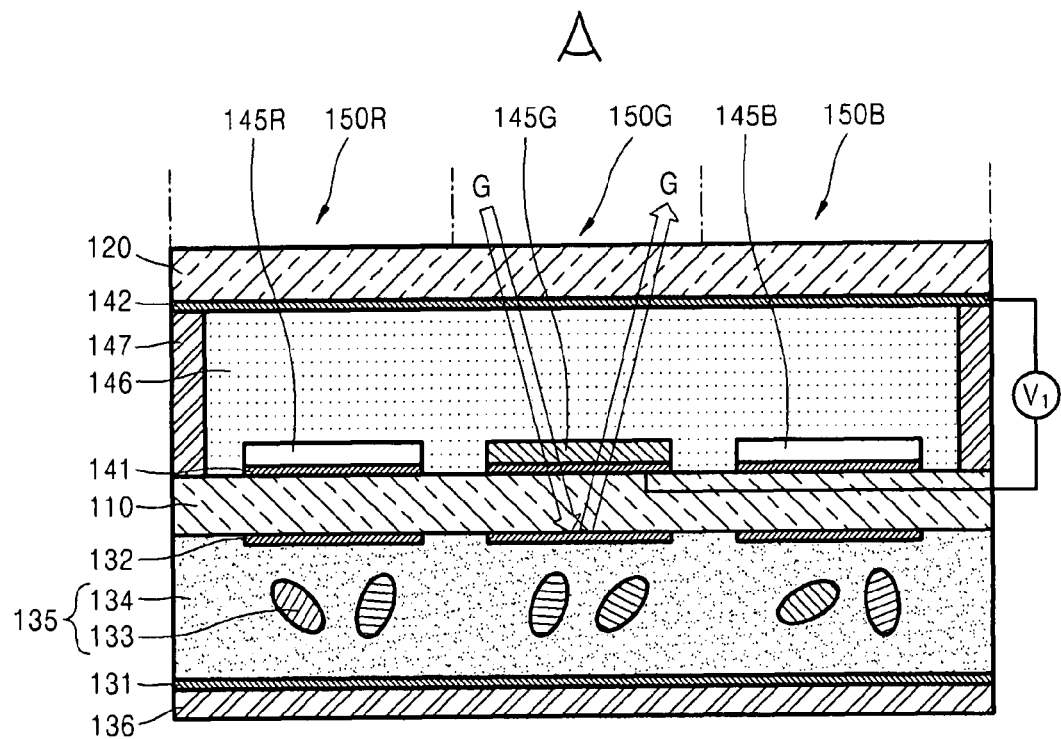
Figure 3:
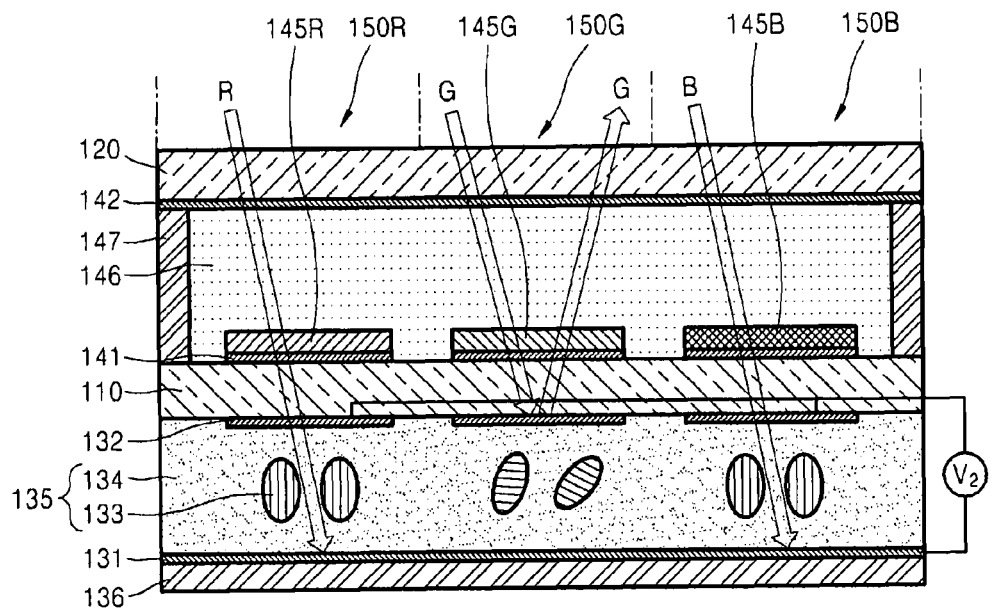

FIGS. 2 and 3 are cross-sectional schematics illustrating a method of driving the display device of FIG. 1. FIG. 2 is a cross-sectional schematic illustrating a method of realizing a still image using the display device of FIG. 1. FIG. 3 is a cross-sectional schematic illustrating a method of realizing a moving image using the display device of FIG. 1. Referring to FIG. 2, a voltage may not be applied between the first electrodes 131 and the second electrodes 132 of the PDLC region 130, a voltage may be applied between the third and fourth electrodes 141 and 142, and electrochromism may be induced in the electrochromic region 140. For example, when a voltage (e.g., V1) is applied between the third and fourth electrodes 141 and 142 corresponding to a green sub-pixel 150G, the green electrochromic layer 145G may undergo electrochromism. An external green light G may penetrate the color-changed green electrochromic layer 145G, the green light G may be reflected by the PDLC region 130, and the reflected green light G may be emitted from the green sub-pixel 150G. When a voltage is not applied between the first electrodes 131 and the second electrodes 132, the PDLC region 130 may reflect an external light. If the voltage applied between the third electrode 141 and the fourth electrode 142 is removed, the green electrochromic layer 145G may maintain the green color due to its memory characteristic. A still image may be realized and maintained by changing colors of the electrochromic layers 145R, 145G, and 145B by the use of the memory property.

Referring to FIG. 3, a voltage (e.g., V1) may be applied between each of the third electrodes 141 and the fourth electrodes 142 of the electrochromic region 140, the red, green and blue electrochromic layers 145R, 145G and 145B respectively may undergo electrochromism and change into red, green and blue colors. When the voltage applied between the third electrodes 141 and the fourth electrodes 142 is removed, the third electrodes 141 and the fourth electrodes 142 may be maintained in a floating state, and the red, green and blue electrochromic layers 145R, 145G, and 145B may maintain the color-changed state due to a memory property. The external red, green and blue lights R, G and B respectively may penetrate the red, green and blue electrochromic layers 145R, 145G and 145B and proceed towards the PDLC region 130. The color-changed red, green and blue electrochromic layers 145R, 145G and 145B may function as a color filter.

A voltage (e.g., V2) may be applied between electrodes of the PDLC region 130, for example, between the first electrode 131 and the second electrodes 132 corresponding to the red and blue sub-pixels 150R and 150B. The red and blue lights R and B from among the red, green and blue lights R, G and B incident to the PDLC region 130 may penetrate the PDLC layer 135 and may be absorbed by the light absorbing layer 136. The green light G may be reflected by the PDLC region 130 and the green light G may be emitted from the green sub-pixel 150G. The PDLC layer 135 may not have a memory property and if a voltage is applied between the first electrodes 131 and the second electrodes 132, a moving image may be realized.

Figure 4:
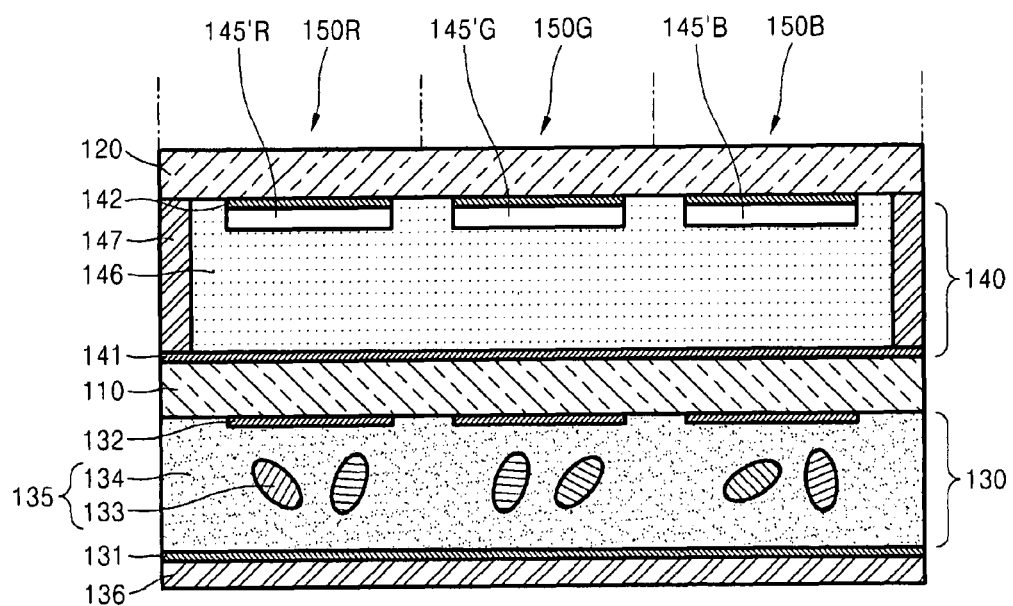

FIG. 4 is a cross-sectional schematic of a display device according to an example embodiment. Referring to FIG. 4, red, green and blue electrochromic layers 145'R, 145'G and 145'B may be on a plurality of fourth electrodes 142, which may be upper electrodes of an electrochromic region 140.

Figure 5:
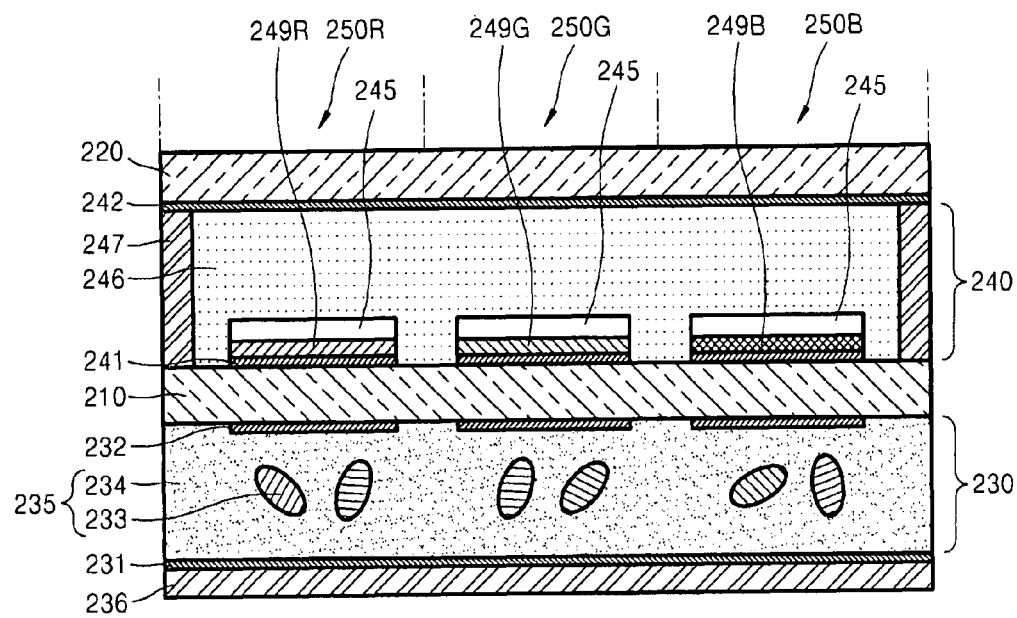

FIG. 5 is a cross-sectional schematic of a display device according to an example embodiment. Referring to FIG. 5, the display device includes a PDLC region 230 and an electrochromic region 240 on the PDLC region 230. The PDLC region 230 may include a plurality of first electrodes 231 and a plurality of second electrodes 232. The first electrodes 231 and the second electrodes 232 may be spaced apart from one other. The PDLC region 230 may also include a PDLC layer 235 between the first electrodes 231 and the second electrodes 232. The first and second electrodes 231 and 232 may be and/or include a transparent conductive material. The PDLC layer 235 may include a polymer 234 and liquid crystals 233 dispersed in the polymer 234. A light absorbing layer 236 may be on the first electrodes 231.

A first transparent substrate 210 may be between the PDLC region 230 and the electrochromic region 240. The electrochromic region 240 may include a plurality of third electrodes 241 and a plurality of fourth electrodes 242. The third electrodes 241 and the fourth electrode 242 may be spaced apart from one another. The electrochromic region 240 may also include a plurality of color filter layers 249R, 249G and/or 249B, on the third electrodes 241. A plurality of electrochromic layers 245 may be on the plurality of color filter layers 249R, 249G and 249B, and an electrolyte layer 246 may be between the third electrodes 241 and the fourth electrodes 242. The third and fourth electrodes 241 and 242 may be a transparent conductive material. The color filter layers 249R, 249G and 249B may be respectively red, green, and blue color filter layers. The electrochromic layers 245 on the color filter layers 249R, 249G and 249B may be a material that is transparent when an electric field is not applied thereto and which undergoes electrochromism and changes into a black color in response to an electric field. A second transparent substrate 220 may be on the fourth electrodes 242. In FIG. 5, reference numeral 247 may denote a dividing wall.

Figure 6:
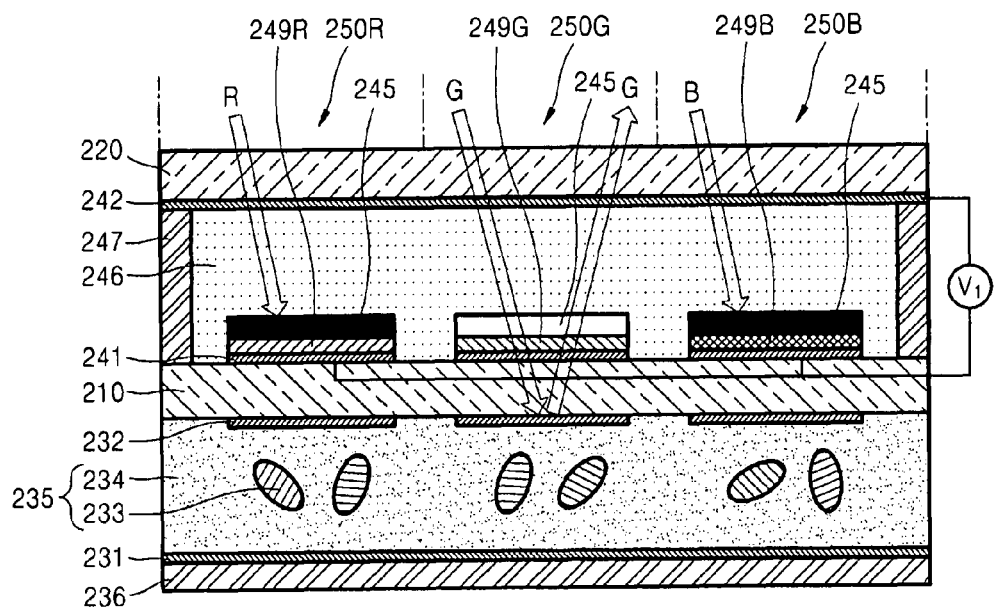
Figure 7:
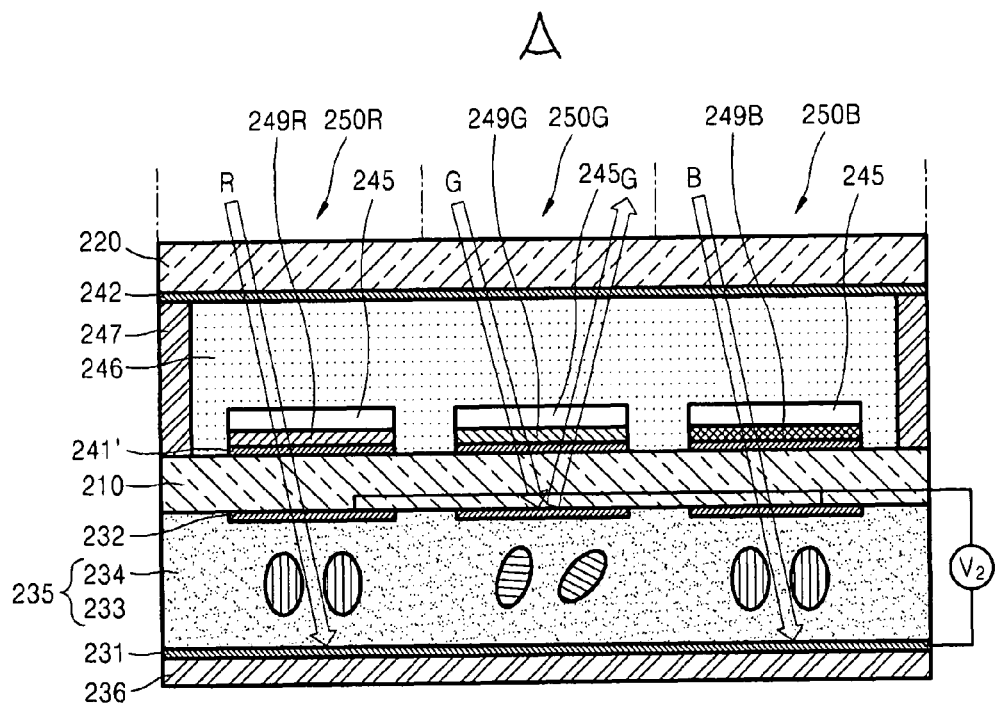

FIGS. 6 and 7 are cross-sectional schematics illustrating a method of driving the display device of FIG. 5. FIG. 6 is a cross-sectional schematic illustrating a method of realizing a still image using the display device of FIG. 5. FIG. 7 is a cross-sectional schematic illustrating a method of realizing a moving image using the display device of FIG. 5. Referring to FIG. 6, a voltage may not be applied between the first electrodes 231 and the second electrodes 232 of the PDLC region 230, a voltage (e.g., V1) may be applied between the third electrodes 241 and the fourth electrode 242 corresponding to red and blue sub-pixels 250R and 250B, and the electrochromic layers 245 of the red and blue sub-pixels 250R and 250B may undergo electrochromism, changing colors (e.g., to black). Only green light G from the external light penetrates the electrochromic layer 245. The penetrating green light G is reflected by the PDLC region 230 and is emitted from the green sub-pixel 250G. Because a voltage is not applied between the first electrodes 231 and the second electrodes 232, the PDLC region 230 reflects external light. If the voltage applied between the third electrodes 241 and the fourth electrodes 242 is removed, the electrochromic layers 245, having changed colors, retain the color-changed (e.g., black) state due to memory characteristics of the electrochromic layers 245. A still image may be realized without requiring an additional power supply by changing colors of the electrochromic layers 245 having memory characteristics.

Referring to FIG. 7, if a voltage is not applied between the third electrodes 241 and the fourth electrodes 242 of the electrochromic region 240, the electrochromic layers 245 may maintain a transparent state. The external red, green and blue lights R, G and B respectively penetrate the red, green and blue color filter layers 249R, 249G and 249B and may proceed towards the PDLC region 230. A voltage (e.g., V2) may be applied between individual electrodes of the PDLC region 230, for example, between the first electrodes 231 and the second electrodes 232 corresponding to the red and blue sub-pixels 250R and 250B. The red and blue lights R and B from among the red, green and blue lights R, G and B incident to the PDLC region 230 may penetrate the PDLC layer 235 and may be absorbed by the light absorbing layer 236. The green light G may be reflected by the PDLC region 230 and may be emitted from the green sub-pixel 250G. The PDLC layer 235 may not have memory characteristics and if a voltage is applied between the first electrodes 231 and the second electrodes 232, a moving image may be realized.

Figure 8:
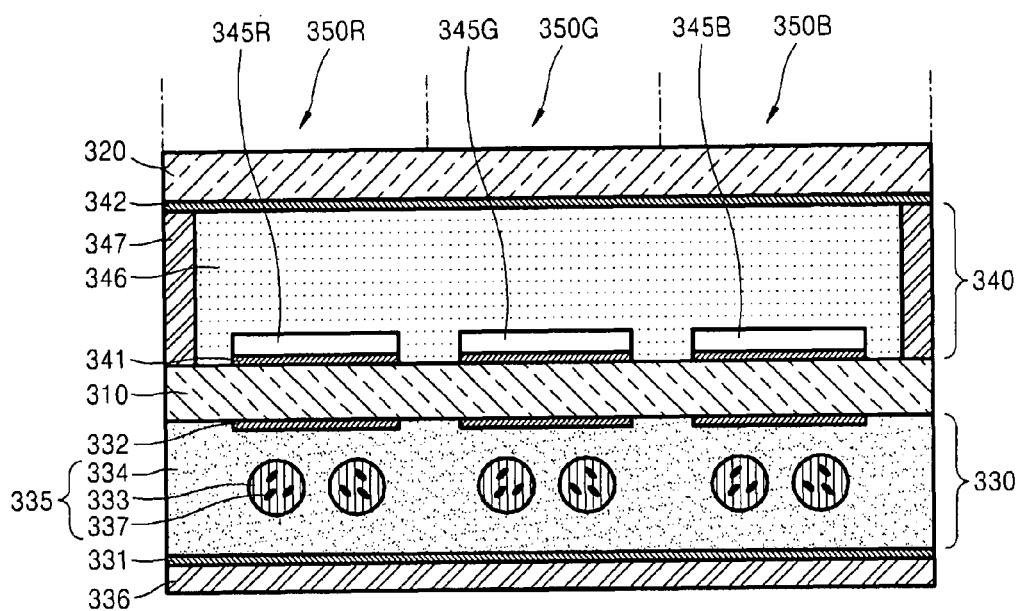

FIG. 8 is a cross-sectional schematic of a display device according to an example embodiment. Referring to FIG. 8, the display device according to an example embodiment includes a PDLC region 330 and an electrochromic region 340 on the PDLC region 330. The PDLC region 330 may include a plurality of first electrodes 331 and a plurality of second electrodes 332. The first electrodes 331 and the second electrodes 332 may be spaced apart from one other. The PDLC region 330 may include a PDLC region layer 335 between the first electrodes 331 and the second electrodes 332. The PDLC layer 335 may include a polymer 334, liquid crystals 333 dispersed in the polymer 334, and a plurality of black dyes 337 included in the liquid crystal 333. A light reflecting layer 336 may be on the first electrodes 331.

A first transparent substrate 310 may be between the PDLC region 330 and the electrochromic region 340. The electrochromic region 340 may include a plurality of third electrodes 341 and a plurality of fourth electrodes 342. The third electrodes 341 and the fourth electrodes 342 may be spaced apart from one another. The electrochromic region 340 may include a plurality of electrochromic layers 345R, 345G and/or 345B, on the third electrodes 341, and an electrolyte layer 346 between the third electrodes 341 and the fourth electrodes 342. The red, green and blue electrochromic layers 345R, 345G and 345B may undergo electrochromism and may pass red, green and blue colors in response to an applied electric field. A transparent second substrate 320 may be on the fourth electrodes 342. In FIG. 8, reference numeral 347 may denote a dividing wall.

Figure 9:
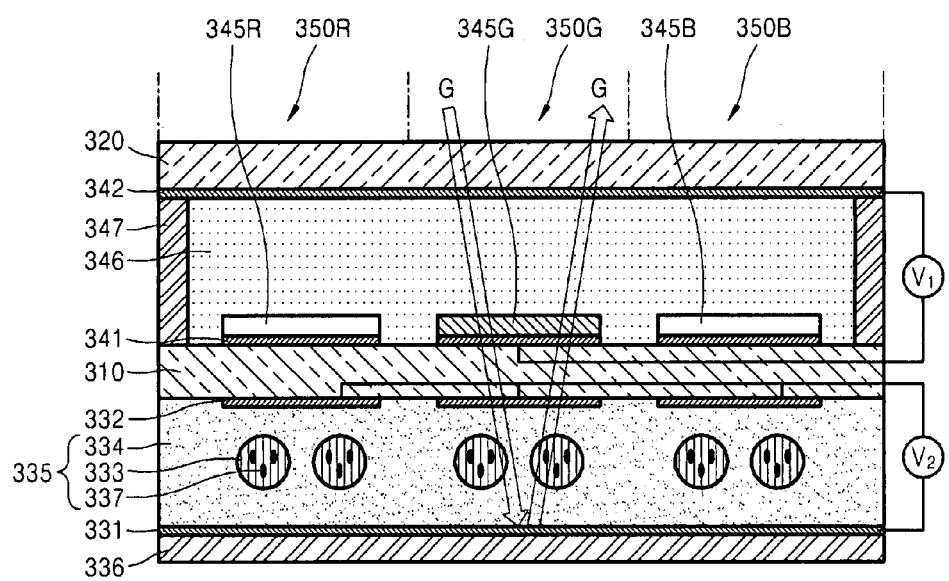
Figure 10:
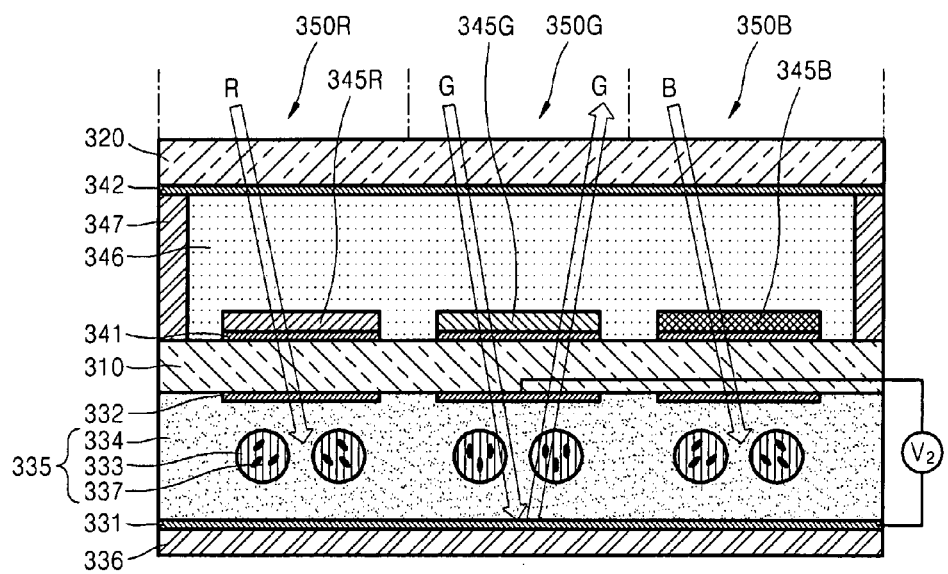

FIG. 9 is a cross-sectional schematic illustrating a method of realizing a still image using the display device of FIG. 8. FIG. 10 is a cross-sectional schematic illustrating a method of realizing a moving image using the display device of FIG. 8. Referring to FIG. 9, a voltage (e.g., V2) may be applied between the first electrodes 331 and the second electrodes 332 of the PDLC region 330, and the PDLC region 330 may pass an external light. In a state in which voltage V2 is applied between the first electrodes 331 and the second electrodes 332, a voltage (e.g., V1) may be applied between the third electrode 341 and the fourth electrode 342 corresponding to a green sub-pixel 350G, and the green electrochromic layer 345G may undergo electrochromism. The external green light G may penetrate the color-changed green electrochromic layer 345G and PDLC region 330, and be reflected by the light reflecting layer 336. The green light G may be emitted from the green sub-pixel 350G. If the voltage applied between the third electrode 341 and the fourth electrode 342 is removed, due to the memory characteristics of the green electrochromic layer 345G, it may maintain the color-changed state. Because of the memory characteristics of the electrochromic layers 345R, 345G and 345B, a still image may be realized by changing the colors of the electrochromic layers 345R, 345G and 345B.

Referring to FIG. 10, when a voltage (e.g., V1) is applied between each of the third electrodes 341 and the fourth electrodes 342 of the electrochromic region 340, the red, green and blue electrochromic layers 345R, 345G and 345B may undergo electrochromism and may respectively change into red, green and blue colors. When the voltage applied between the third electrodes 341 and the fourth electrodes 342 is removed and the third electrodes 341 and the fourth electrodes 342 are maintained in a floating state, the red, green and blue electrochromic layers 345R, 345G and 345B may maintain the color-changed state due to the memory characteristics of the electrochromic materials. The external red, green and blue lights R, G and B may respectively penetrate the red, green and blue electrochromic layers 345R, 345G and 345B, and proceed towards the PDLC region 330. The color-changed red, green and blue electrochromic layers 345R, 345G and 345B may function as a color filter.

A voltage (e.g., V2) may be applied between electrodes of the PDLC region 330, for example, between the first electrodes 331 and the second electrodes 332 corresponding to the green sub-pixel 350G. The red and blue lights R and B from among the red, green and blue lights R, G and B incident to the PDLC region 330 may be absorbed into black dyes 337 of the PDLC layer 335. The green light G may penetrate the PDLC layer 335 and be reflected by the light reflecting layer 336. The green light G may be emitted from the green sub-pixel 350G. The PDLC layer 335 may not have memory characteristics and if a voltage is applied between the first electrodes 331 and the second electrodes 332, a moving image may be realized.

Figure 11:
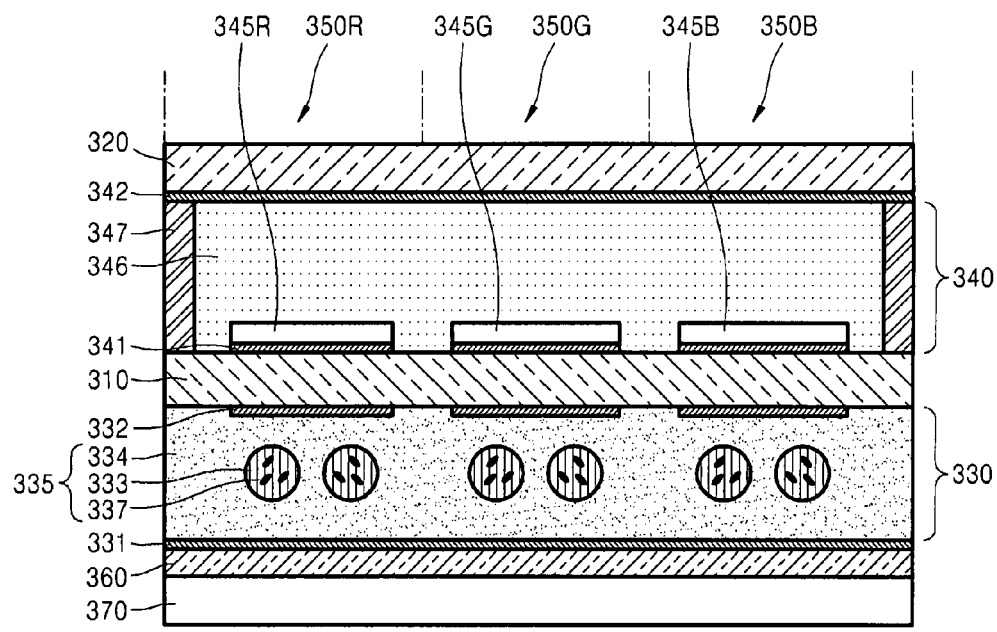

FIG. 11 is a cross-sectional schematic of a display device according to an example embodiment. Referring to FIG. 11, the display device may include a PDLC region 330, an electrochromic region 340 on the PDLC region 330, and a backlight unit 370 on the PDLC region 330. The backlight unit 370 may be on a side of the PDLC region 330 opposite the electrochromic region 340. The PDLC region 330 may include a plurality of first electrodes 331 and a plurality of second electrodes 332. The first electrodes 331 and the second electrodes 332 may be spaced apart from one another. The PDLC region 330 may include a PDLC layer 335 between the first electrodes 331 and the second electrodes 332. The PDLC layer 335 may include a polymer 334, liquid crystals 333 dispersed in the polymer 334, and black dyes 337 included in the liquid crystal 333.

A transparent first substrate 310 may be between the PDLC region 330 and the electrochromic region 340. The electrochromic region 340 may include a plurality of third electrodes 341 and a plurality of fourth electrodes 342. The third electrodes 341 and the fourth electrodes 342 may be spaced apart from one another. The electrochromic region 340 may include a plurality of electrochromic layers 345R, 345G and/or 345B on the third electrodes 341, and an electrolyte layer 346 between the third electrodes 341 and the fourth electrode 342. The display device may include a red electrochromic layer 345R, a green electrochromic layer 345G, and a blue electrochromic layer 345B which undergo electrochromism and change into red, green, and blue colors in response to an electric field applied to the pixel. A second transparent substrate 320 may be on the fourth electrodes 342. In FIG. 11, reference numeral 347 may denote a dividing wall. The backlight unit 370 may radiate white light W towards the PDLC region 330 and may be on the PDLC region 330. A transparent plate 360 may be between the PDLC region 330 and the backlight unit 370.

Figure 12:
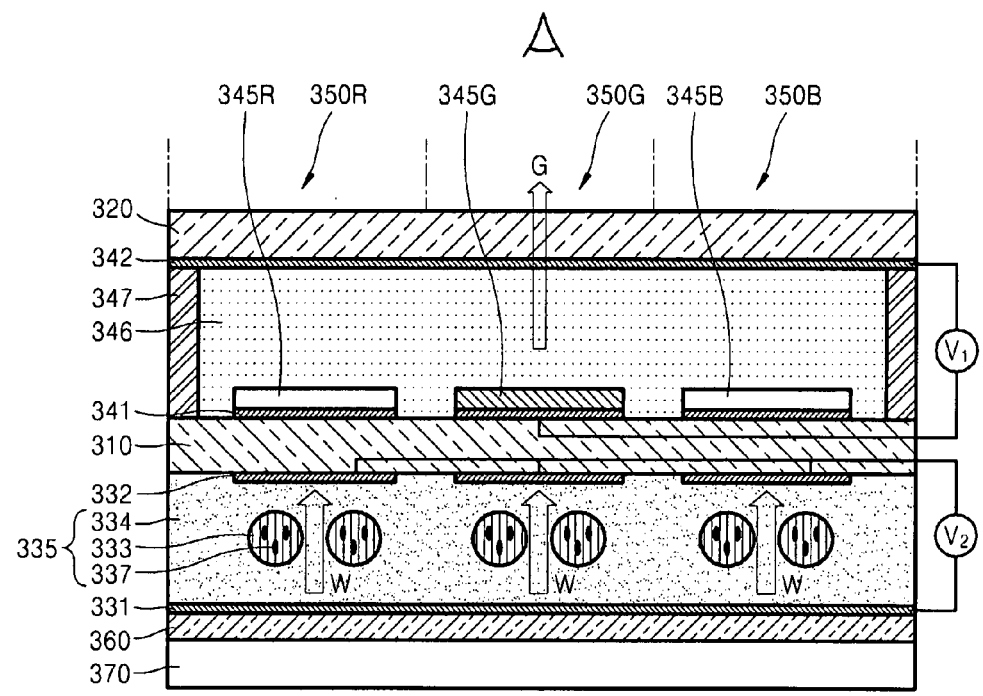
Figure 13:
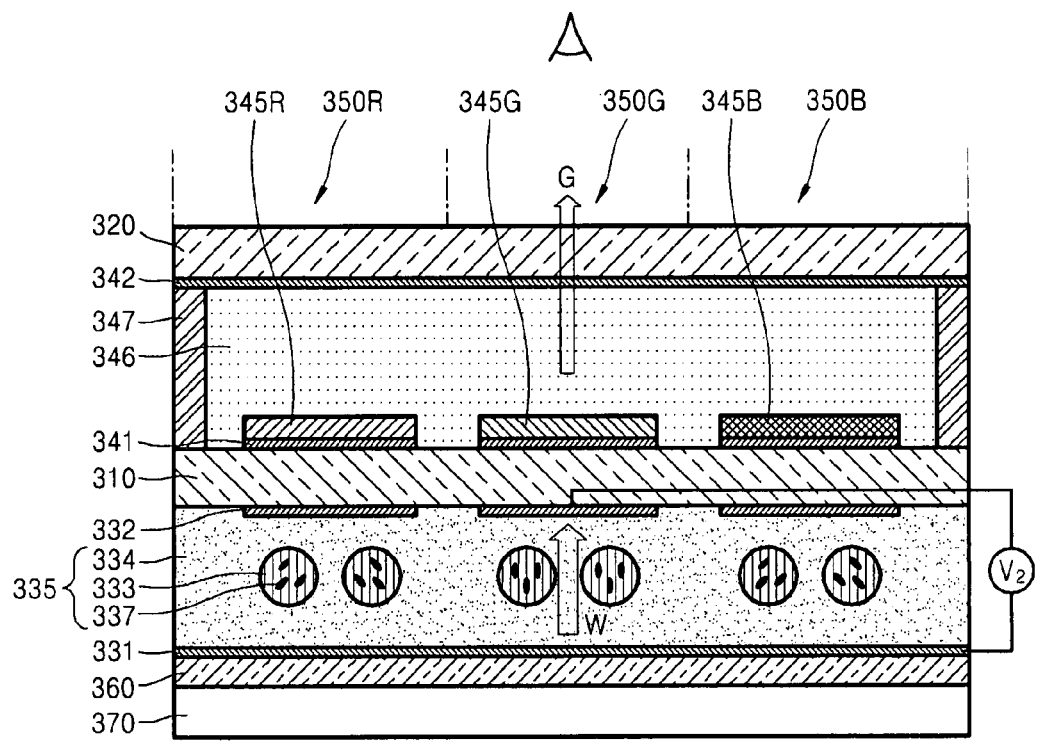

FIGS. 12 and 13 are cross-sectional schematics for illustrating a method of driving the display device of FIG. 11. FIG. 12 is a cross-sectional schematic illustrating a method of realizing a still image using the display device of FIG. 11. FIG. 13 is a cross-sectional schematic illustrating a method of realizing a moving image using the display device of FIG. 11.

Referring to FIG. 12, when a voltage (e.g., V2) is applied between the first electrodes 331 and the second electrodes 332 of the PDLC region 330, the PDLC region 330 may pass an external light. In the state where voltage V2 is applied between the first electrodes 331 and the second electrodes 332, a voltage (e.g., V1) may be applied between the third electrodes 341 and the fourth electrodes 342 corresponding to a green sub-pixel 350G so that the green electrochromic layer 345G undergoes electrochromism. Green light G of the white light W radiated from the backlight unit 370 may penetrates the color-changed green electrochromic layer 345R and the green light G may be emitted from the green sub-pixel 350G. If the voltage applied between the third electrode 341 and the fourth electrode 342 is removed, the green electrochromic layer 345G, which has changed into the green color, may maintain the color-changed state due to the memory characteristics of the electrochromic layer 345G. Because of the memory characteristics, a desired still image may be realized by changing colors of the electrochromic layers 345R, 345G and 345B even when voltage is not applied between the third electrode 341 and the fourth electrode 342.

Referring to FIG. 13, when a voltage (e.g., V1) is applied between each of the third electrodes 341 and the fourth electrodes 342 of the electrochromic region 340, and the red, green and blue electrochromic layers 345R, 345G and 345B may undergo electrochromism and respectively change into red, green and blue colors. If the voltage applied between the third electrodes 341 and the fourth electrodes 342 is removed and the third electrodes 341 and the fourth electrodes 342 are maintained in a floating state, the red, green and blue electrochromic layers 345R, 345G and 345B, which have changed colors, may maintain the color-changed state due the memory characteristics of the electrochromic layers 345R, 345G and 345B. The color-changed red, green, and blue electrochromic layers 345R, 345G and 345B may function as a color filter.

A voltage (e.g., V2) may be applied between the electrodes of the PDLC region 330, for example, between the first electrode 331 and the second electrode 332 corresponding to the green sub-pixel 350G. The red and blue lights R and B of the white light W radiated from the backlight unit 370 may be absorbed into black dyes 337 in the PDLC layer 335. The green light G may penetrate the PDLC layer 335 and the color-changed green electrochromic layer 345G. The green light G may be emitted from the green sub-pixel 350G. The PDLC layer 335 may not have memory characteristics and if a voltage is applied between the first electrodes 331 and the second electrodes 332, a moving image may be realized.

Figure 14:
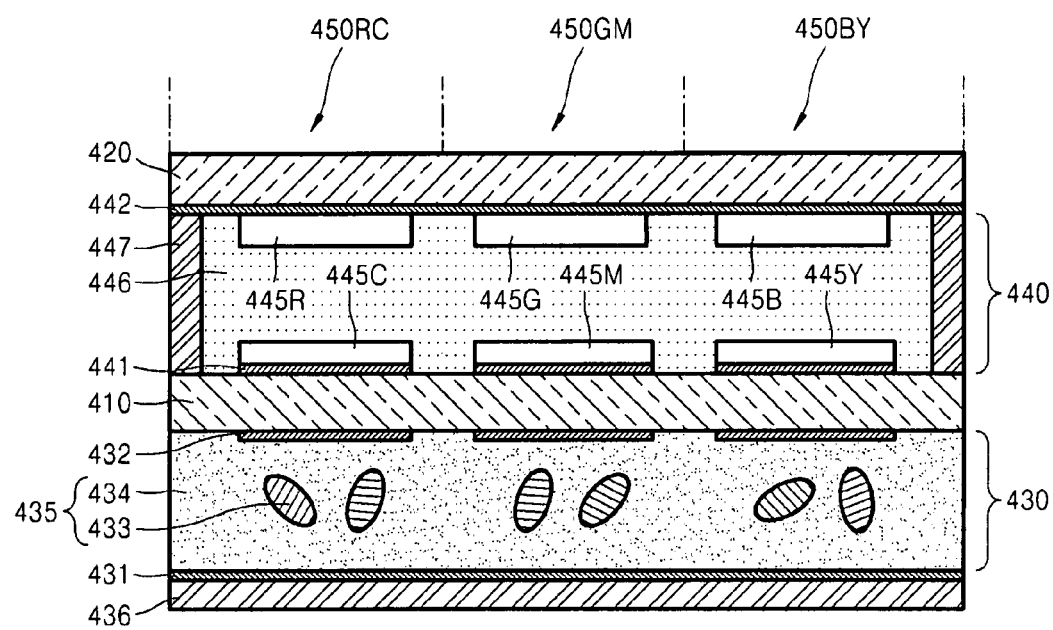

FIG. 14 is a cross-sectional schematic of a display device according to an example embodiment. Referring to FIG. 14, the display device may include a PDLC region 430 and an electrochromic region 440 on the PDLC region 430. The PDLC region 430 may include a plurality of first electrodes 431 and a plurality of second electrodes 432. The first electrodes 431 and the second electrodes 432 may be spaced apart from one another. The PDLC region 430 may include a PDLC layer 435 between the first electrodes 431 and the second electrodes 432. The PDLC layer 435 may include a polymer 434 and liquid crystals 433 dispersed in the polymer 434. A light absorbing layer 436 may be on the first electrodes 431. A first transparent substrate 410 may be between the PDLC region 430 and the electrochromic region 440. The electrochromic region 440 may include a plurality of third electrodes 441 and a plurality of fourth electrodes 442, wherein the plurality of third electrodes 441 and the fourth electrodes 442 may be spaced apart from one another. The electrochromic region 440 may include a plurality of electrochromic layers 445R, 445G, 445B, 445C, 445M and/or 445Y, and an electrolyte layer 446, between the third electrodes 441 and the fourth electrodes 442.

The display device may include red and cyan electrochromic layers 445R and 445C which may face each other in a vertical direction, green and magenta electrochromic layers 445G and 445M which may face each other in a vertical direction, and blue and yellow electrochromic layers 445B and 445Y which may face each other in a vertical direction. The red and cyan electrochromic layers 445R and 445C may constitute a red-cyan sub-pixel 450RC, the green and magenta electrochromic layers 445G and 445M may constitute a green-magenta sub-pixel 450GM, and the blue and yellow electrochromic layers 445B and 445Y may constitute a blue-yellow sub-pixel 450BY. A second transparent substrate 420 may be on the fourth electrodes 442. In FIG. 14, reference numeral 447 may denote a dividing wall. Because the electrochromic layers 445R, 445G and 445B respectively corresponding to the electrochromic layers 445C, 445M and 445Y may face each other in a vertical direction within the pixel, the color reproducibility of the pixel of the display device may be increased.

Figure 15:
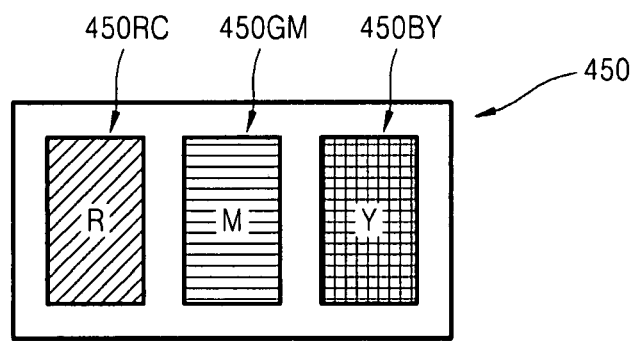

FIG. 15 is a schematic illustrating a process for realizing a red color using the display device of FIG. 14. Referring to FIG. 14, when the red electrochromic layer 445R, the magenta electrochromic layer 445M and the yellow electrochromic layer 445Y are respectively color-changed, red, magenta and yellow, lights R, M and Y may be respectively emitted from the red-cyan sub-pixel 450RC, the green-magenta sub-pixel 450GM and the blue-yellow sub-pixel 450BY as illustrated in FIG. 15. Because magenta and yellow may mix to form red, red color may be better obtained as compared to the case where a red light is emitted from one sub-pixel.

Figure 16A:
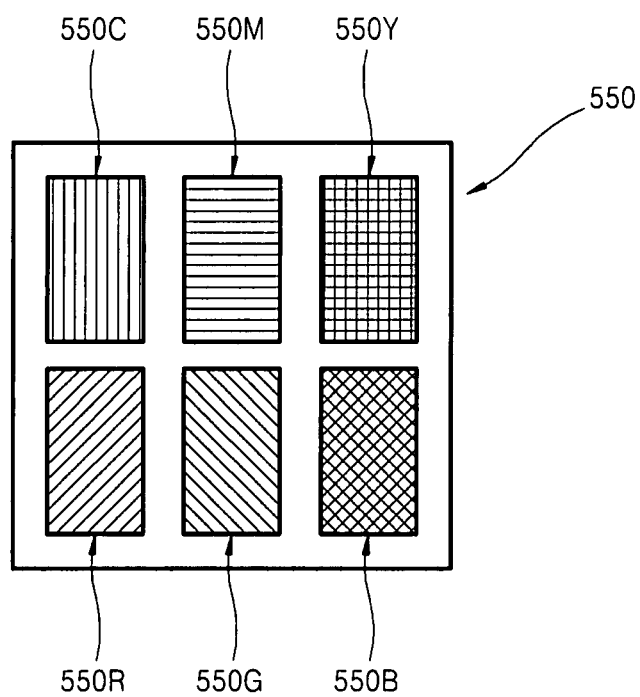
FIGS. 16A-16C are schematics illustrating modified examples of a pixel of the display device of FIG. 14.
Figure 16B:
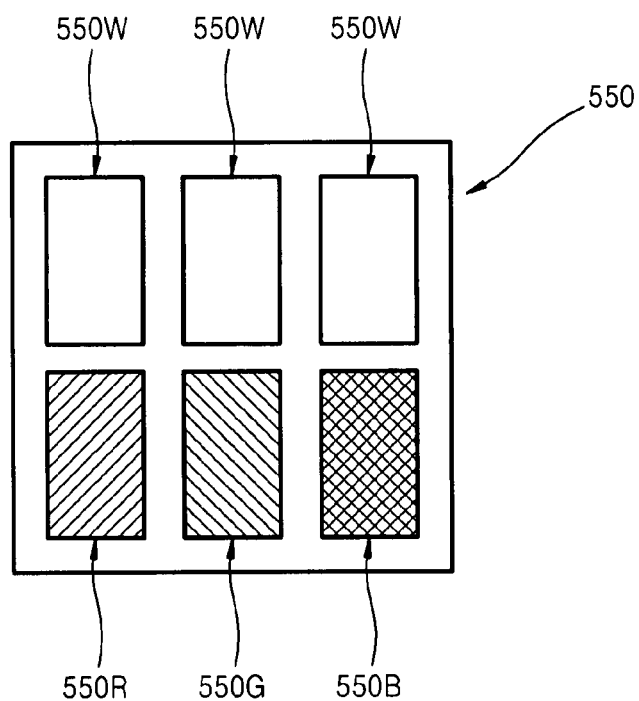
Figure 16C:
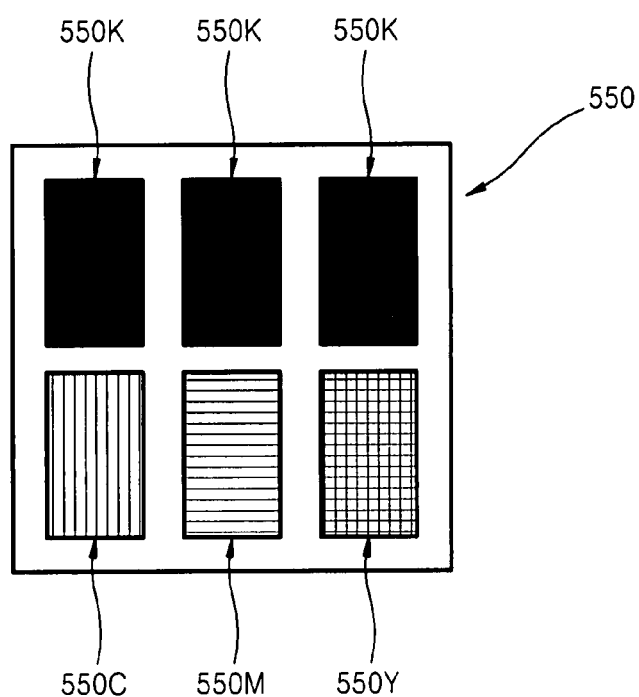

FIGS. 16A-16C are schematics illustrating modified examples of a pixel of the display device of FIG. 14. The pixel illustrated in FIGS. 16A through 16C may include six sub-pixels. Referring to FIG. 16A, a pixel 550 may include red, green, blue, cyan, magenta and yellow sub-pixels 550R, 550G, 550B, 550C, 550M and/or 550Y, which may be red, green, blue, cyan, magenta and yellow electrochromic layers arranged in the same plane. Referring FIG. 16B, a pixel 550 may include three transparent sub-pixels 550W and red, green and blue sub-pixels 550R, 550G and 550B. The transparent sub-pixels 550W may be electrochromic layers of a material that transmits when an electric field is not applied thereto. Referring to FIG. 16C, a pixel 550 may include three black sub-pixels 550K and cyan, magenta and yellow sub-pixels 550C, 550M and 550Y. The black sub-pixels 550K may be an electrochromic layer of a material whose color changes into a black color when an electric field is applied thereto. In a pixel according to example embodiments illustrated in FIGS. 16A through 16C, color reproducibility of the pixel may be increased. The modified pixels described above are examples and other modified pixels may be used. The modified pixels of the examples, and other modified pixels, may be applied to all the aforementioned embodiments.

Figure 17:
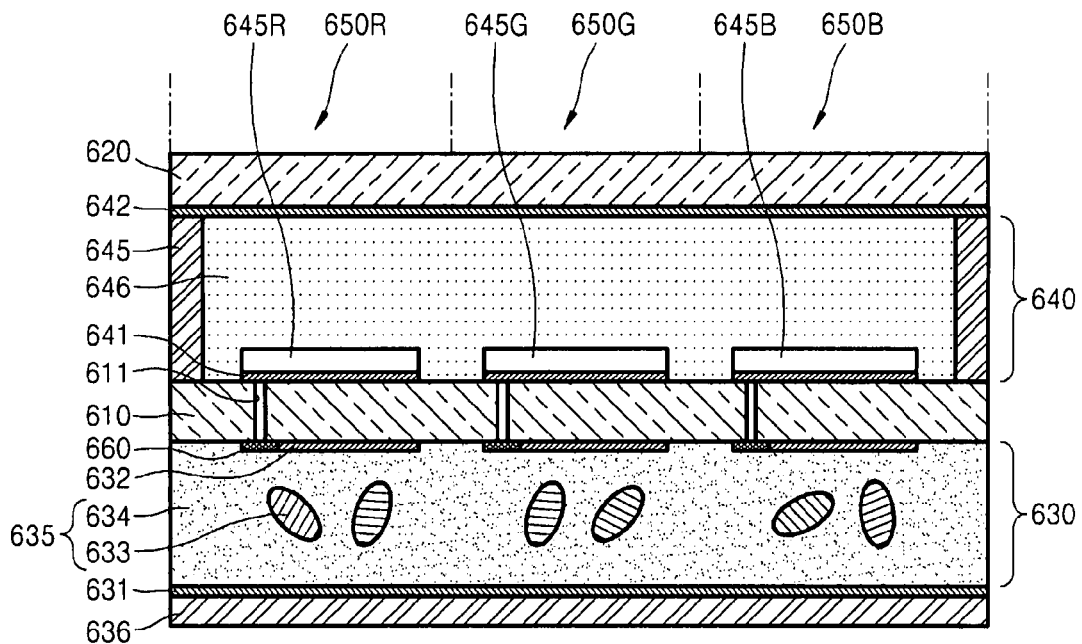

FIG. 17 is a cross-sectional schematic of a display device according to an example embodiment. Referring to FIG. 17, the display device may include a PDLC region 630 and an electrochromic region 640 on the PDLC region 630. The PDLC region 630 may include a first electrode 631 and a plurality of second electrodes 632. The first electrode 631 and the plurality of second electrodes 632 may be spaced apart from one other. The PDLC region 630 may include a PDLC layer 635 between the first electrode 631 and the second electrodes 632. The first electrode 631 may be a common electrode and the second electrodes 632 may be pixel electrodes corresponding to sub-pixels 650R, 650G and 650B. The PDLC layer 635 may include a polymer 634 and liquid crystals 633 dispersed in the polymer 634. A light absorbing layer 636 may be on the first electrode 631.

A transparent first substrate 610 may be between the PDLC region 630 and the electrochromic region 640. The electrochromic region 640 may include a fourth electrode 642, a plurality of third electrodes 641, a plurality of electrochromic layers 645R, 645G and/or 645B on the third electrodes 641, and an electrolyte layer 646 between the third electrodes 641 and the fourth electrode 642. The third electrodes 641 may be pixel electrodes corresponding to the sub-pixels 650R, 650G and 650B, and the fourth electrode 642 may be a common electrode. The red electrochromic layer 645R, the green electrochromic layer 645G and the blue electrochromic layer 645B may be respectively on the third electrodes 641. The electrolyte layer 646 may be between the third electrodes 641 and the fourth electrode 642.

A transparent second substrate 620 may be on the fourth electrode 642. In FIG. 17, reference numeral 645 may denote a dividing wall. The second electrodes 632 and the third electrodes 641, which may be pixel electrodes corresponding to each other, may be electrically connected to a thin film transistor (TFT) 660 through a via hole 611. Although the first electrode and the fourth electrode are described as common electrodes, and the second electrodes and the third electrodes are described as pixel electrodes, this may be reversed. The second electrodes and the third electrodes may be single body common electrodes and a plurality of first and fourth electrodes may be pixel electrodes. In this case, the second electrode and the third electrode may be electrically connected to one TFT.

Figure 18:
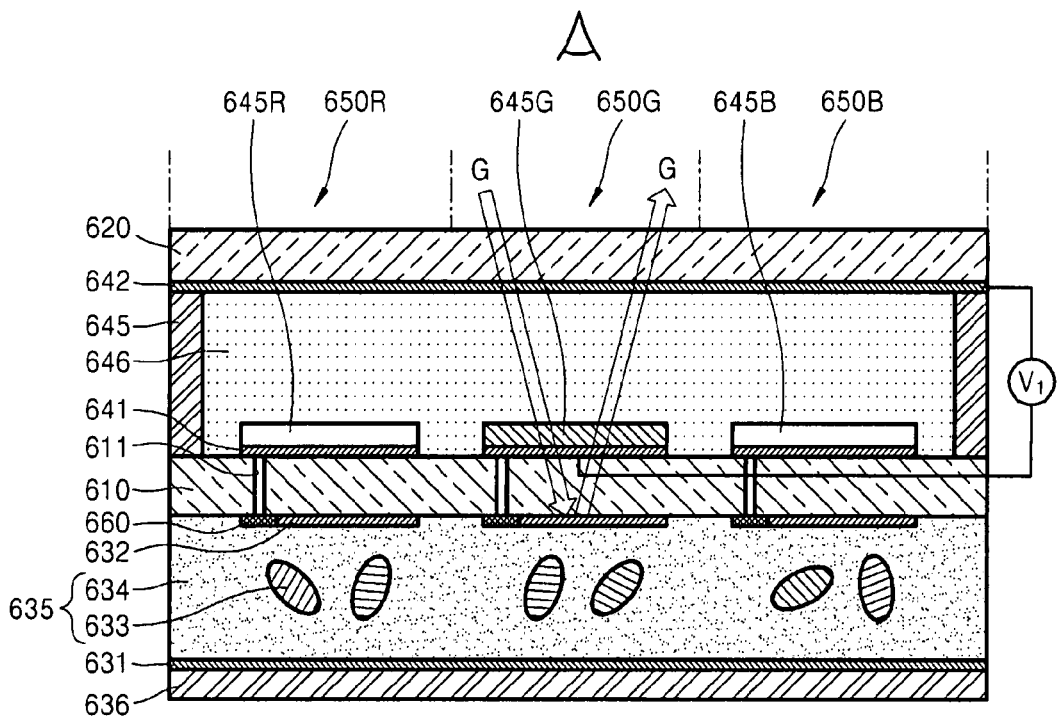
Figure 19:
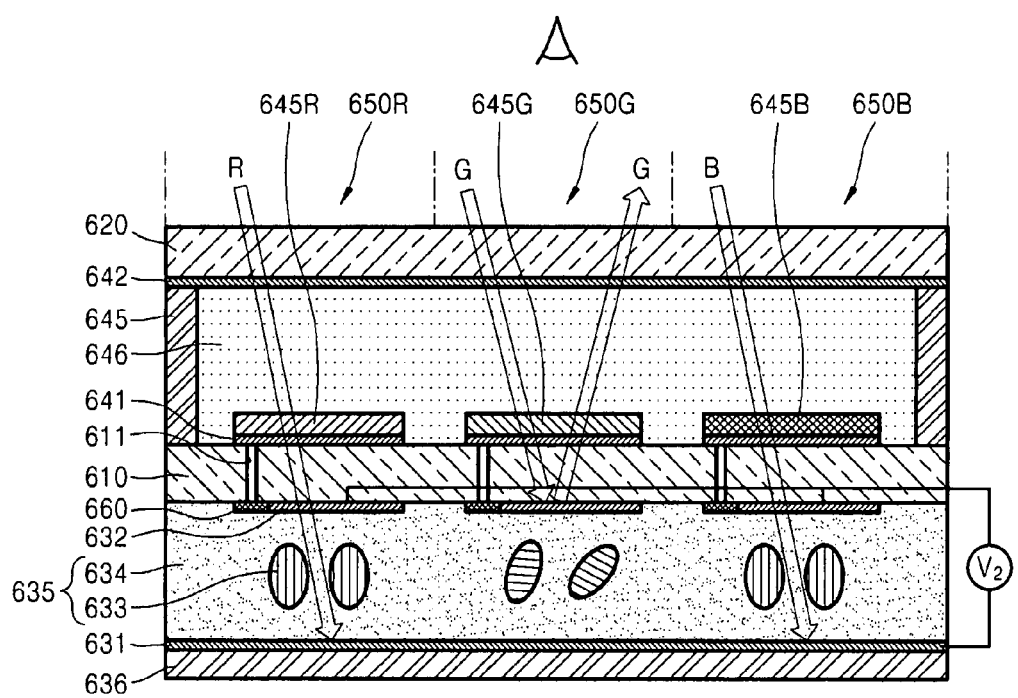

FIGS. 18 and 19 are cross-sectional schematics illustrating a method of driving the display device of FIG. 17. FIG. 18 is a cross-sectional schematic illustrating a method of realizing a still image using the display device of FIG. 17. FIG. 19 is a cross-sectional schematic illustrating a method of realizing a moving image using the display device of FIG. 17. Referring to FIG. 18, if a voltage is not applied between the first electrode 631 and the second electrodes 632 of the PDLC region 630 and a voltage (e.g., V1) is applied through a TFT between third electrodes 641 corresponding to the green sub-pixel 650G and the fourth (common) electrode 642, the green electrochromic layer 645G may undergo electrochromism. An external green light G may penetrate the color-changed green electrochromic layer 645G, may be reflected by the PDLC region 630, and may be emitted from the green sub-pixel 650G. Because a voltage is not applied between the first electrode 631 and the second electrodes 632, the PDLC region 630 reflects external light. If the voltage applied between the third electrodes 641 and the fourth electrode 642 is removed, the green electrochromic layer 645G, which may have color-changed into green color, may maintain the color-changed state due to memory characteristics of the electrochemical layer 645G. A still image may be realized by changing colors of the electrochromic layers 645R, 645G and 645B, and maintaining the color-change states because of the memory characteristics of the electrochromic layers 650R, 650G and 650B.

Referring to FIG. 19, when a voltage (e.g., V1) is applied between the third electrodes 641 and the fourth (common) electrode 642 through each of the TFTs 660, the red, green and blue electrochromic layers 645R, 645G and 645B may undergo electrochromism. The red, green and blue electrochromic layers 645R, 645G and 645B may respectively change into red, green and blue colors. If the voltage applied between the third electrodes 641 and the fourth electrode 642 is removed and the third electrodes 641 and the fourth electrode 642 are maintained in a floating state, the red, green and blue electrochromic layers 645R, 645G and 645B may maintain the color-changed state due to memory characteristics of the electrochromic layers. Accordingly, the external red, green and blue lights R, G and B respectively may penetrate the red, green and blue electrochromic layers 645R, 645G and 645B and may proceed towards the PDLC region 630. The color-changed red, green and blue electrochromic layers 645R, 645G and 645B may function as a color filter.

A voltage (e.g., V2) may be applied between the first (common) electrode 631 and the second electrodes 632 corresponding to the red and blue sub-pixels 650R and 650B. The red and blue lights R and B from among the red, green and blue lights R, G and B, incident to the PDLC region 630, may penetrate the PDLC layer 635 and may be absorbed into the light absorbing layer 636. The green light G may be reflected by the PDLC region 630, and thus the green light G may be emitted from the green sub-pixel 650G. The PDLC layer 635 may not have memory characteristics and if a voltage is applied between the first (common) electrode 631 and the second electrodes 632, a moving image may be realized.

According to an example embodiment, two pixel electrodes corresponding to each other may be electrically connected to a single TFT 660, thereby reducing the manufacturing cost of the display device. This configuration may be also applied to the aforementioned embodiments.

While example embodiments have been particularly shown and described, it will be understood by one of ordinary skill in the art that variations in form and detail may be made therein without departing from the spirit and scope of the claims.

What is claimed is:

1. A display device, comprising:
   a plurality of first electrodes and a plurality of second electrodes;
   a polymer dispersed liquid crystal (PDLC) layer between the first electrodes and the second electrodes;
   a plurality of third electrodes and a plurality of fourth electrodes on and spaced apart from the second electrodes,
   a plurality of electrochromic layers between the third electrodes and the fourth electrodes; and
   an electrolyte layer between the third electrodes and the fourth electrodes,
   wherein the first electrodes include a common electrode that is a single body,
   the second electrodes include first pixel electrodes,
   the third electrodes include second pixel electrodes corresponding to the first pixel electrodes, and
   the fourth electrodes include a common electrode that is a single body.

2. The display device of claim 1, wherein the PDLC layer, the first electrodes, the second electrodes, the third electrodes, the fourth electrodes, the electrochromic layers, and the electrolyte layer are included in a pixel of the display device.

3. The display device of claim 2, wherein the electrochromic layers include at least three different electrochromic layers.

4. The display device of claim 1, further comprising:
   a light absorbing layer on the first electrodes.

5. The display device of claim 1, wherein the first pixel electrodes and the second pixel electrodes that correspond to each other are electrically connected by at least one thin film transistor (TFT).

6. A method of driving the display device of claim 1 to realize a still image, the method comprising:
   applying a voltage between at least one corresponding pair of electrodes, the corresponding pair of electrodes including one of the third electrodes and one of the fourth electrodes; and
   not applying a voltage between the first and second electrodes.

7. A method of driving the display device of claim 1 to realize a moving image, the method comprising:
   applying a first voltage between the third electrodes and the fourth electrodes;
   removing the first voltage and leaving the third and fourth electrodes in a floating state; and
   applying a second voltage between at least one corresponding pair of electrodes, the corresponding pair of electrodes including one of the first electrodes and one of the second electrodes.

8. A display device, comprising:
   a plurality of first electrodes and a plurality of second electrodes;
   a polymer dispersed liquid crystal (PDLC) layer between the first electrodes and the second electrodes;
   a plurality of third electrodes and a plurality of fourth electrodes on and spaced apart from the second electrodes,
   a plurality of electrochromic layers between the third electrodes and the fourth electrodes; and
   an electrolyte layer between the third electrodes and the fourth electrodes,
   wherein the electrochromic layers include red and cyan electrochromic layers which face each other in a vertical direction,
   green and magenta electrochromic layers which face each other in a vertical direction, and
   blue and yellow electrochromic layers which face each other in a vertical direction.

9. A display device, comprising:
   a plurality of first electrodes and a plurality of second electrodes;
   a polymer dispersed liquid crystal (PDLC) layer between the first electrodes and the second electrodes;
   a plurality of third electrodes and a plurality of fourth electrodes on and spaced apart from the second electrodes,
   a plurality of electrochromic layers between the third electrodes and the fourth electrodes;
   an electrolyte layer between the third electrodes and the fourth electrodes, and
   a plurality of color filter layers corresponding to the electrochromic layers, the color filter layers between the third electrodes and the fourth electrodes.

10. The display device of claim 9, wherein the electrochromic layers are a material that changes into a black color in response to an electric field.

11. The display device of claim 9, wherein the color filter layers include at least three color filter layers each having a different color.

12. The display device of claim 9, wherein the color filter layers include red and cyan color filter layers which face each other in a vertical direction,
   green and magenta color filter layers which face each other in a vertical direction, and
   blue and yellow color filter layers which face each other in a vertical direction.

13. The display device of claim 9, wherein the first electrodes include a common electrode that is a single body, the second electrodes include first pixel electrodes corresponding to sub-pixels,
the third electrodes include second pixel electrodes corresponding to the first pixel electrodes, and
the fourth electrodes include a common electrode that is a single body.

14. The display device of claim 13, wherein the first pixel electrodes and the second pixel electrodes that correspond to each other are electrically connected by at least one TFT.

15. A method of driving the display device of claim 9 to realize a still image, the method comprising;
applying a voltage between at least one corresponding pair of electrodes, the corresponding pair of electrodes including one of the third electrodes and one of the fourth electrodes; and
not applying a voltage between the first electrodes and the second electrodes.

16. A method of driving the display device of claim 9 to realize a moving image, the method comprising:
applying a voltage between a corresponding pair of electrodes, the corresponding pair of electrodes including one of the first electrodes and one of the second electrodes; and
not applying a voltage between the third electrodes and the fourth electrodes.

17. A display device comprising:
a plurality of first electrodes and a plurality of second electrodes;
a PDLC layer between the first electrodes and the second electrodes, and including black dyes;
a plurality of third electrodes and a plurality of fourth electrodes, the third electrodes and the fourth electrodes on and spaced apart from the second electrodes;
a plurality of electrochromic layers between the third electrodes and the fourth electrodes; and
an electrolyte layer between the third electrodes and the fourth electrodes,
wherein the first electrodes include a common electrode that is a single body,
the second electrodes include first pixel electrodes corresponding to sub-pixels,
the third electrodes include second pixel electrodes corresponding to the first pixel electrodes, and
the fourth electrodes include a common electrode that is a single body.

18. The display device of claim 17, further comprising:
a light reflecting layer on the first electrodes.

19. The display device of claim 17, further comprising:
a backlight unit on the first electrodes.

20. The display device of claim 19, further comprising:
a transparent plate between the first electrodes and the backlight unit.

21. The display device of claim 17, wherein the PDLC layer, the first electrodes, the second electrodes, the third electrodes, the fourth electrodes, the electrochromic layers and the electrolyte layer are included in a pixel of the display device.

22. The display device of claim 21, wherein the electrochromic layers include at least three electrochromic layers each having a different color.

23. The display device of claim 17, wherein the first pixel electrodes and the second pixel electrodes that correspond to each other are electrically connected by at least one TFT.

24. A method of driving the display device of claim 17, to realize a still image, the method comprising:
applying a voltage between at least one corresponding pair of electrodes, the corresponding pair of electrodes including one of the third electrodes and one of the fourth electrodes, and
applying a voltage between the first electrodes and the second electrodes.

25. A method of driving the display device of claim 17 to realize a moving image, the method comprising:
applying a voltage between the third electrodes and the fourth electrodes;
removing the voltage, leaving the third and fourth electrodes in a floating state; and
applying a voltage between at least one corresponding pair of electrodes, the corresponding pair of electrodes including one of the first electrodes and one of the second electrodes.

26. A display device, comprising:
a plurality of first electrodes and a plurality of second electrodes;
a PDLC layer between the first electrodes and the second electrodes, and including black dyes;
a plurality of third electrodes and a plurality of fourth electrodes, the third electrodes and the fourth electrodes on and spaced apart from the second electrodes;
a plurality of electrochromic layers between the third electrodes and the fourth electrodes; and
an electrolyte layer between the third electrodes and the fourth electrodes,
wherein the electrochromic layers include red and cyan electrochromic layers which face each other in a vertical direction,
green and magenta electrochromic layers which face each other in a vertical direction, and
blue and yellow electrochromic layers which face each other in a vertical direction.

* * * * *